Figure 1:
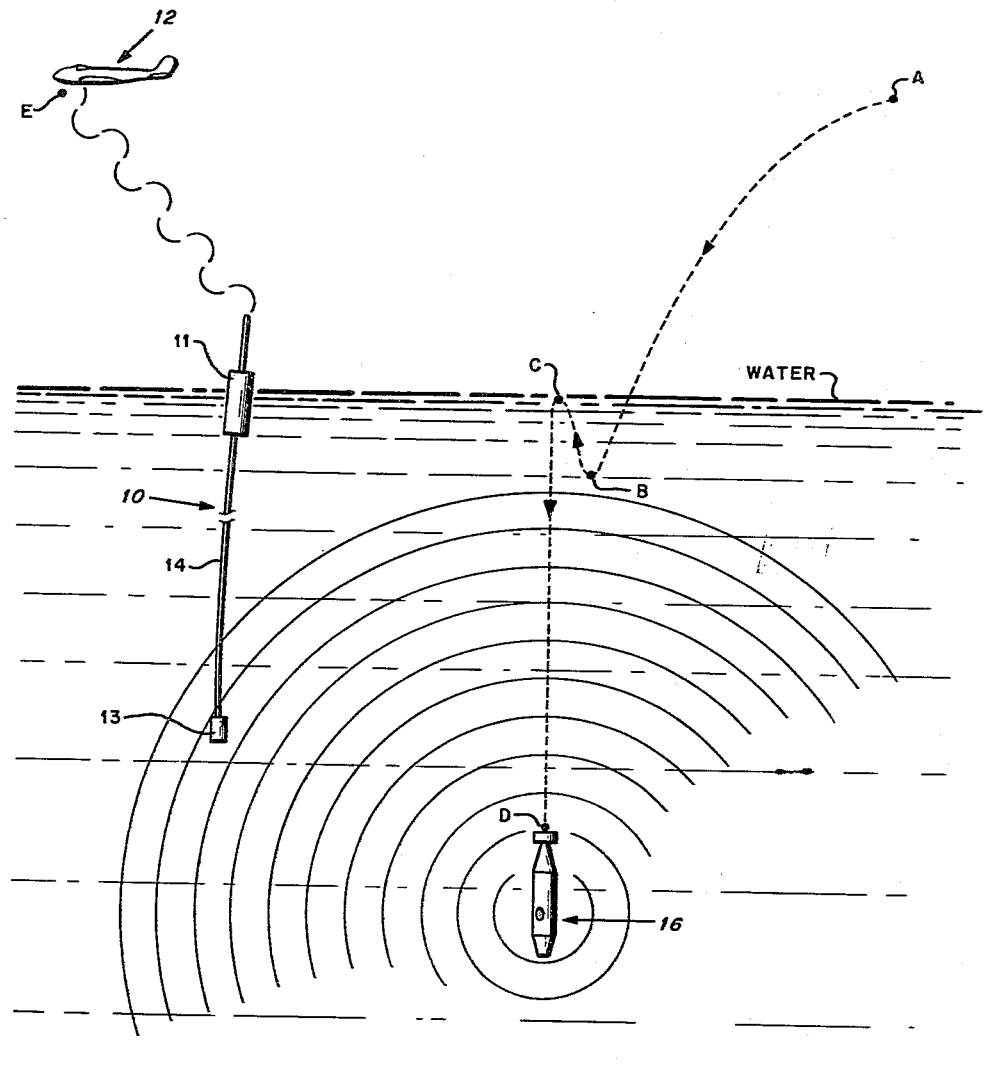

July 23, 1963   J. J. COOP   3,098,993
SONOBUOY-BATHYTHERMOGRAPH SYSTEM
Filed Dec. 21, 1959   3 Sheets-Sheet 1

INVENTOR.
JESSE J. COOP
BY

AGENT

July 23, 1963

J. J. COOP 3,098,993

SONOBUOY-BATHYTHERMOGRAPH SYSTEM

Filed Dec. 21, 1959

3 Sheets-Sheet 2

INVENTOR.
JESSE J. COOP

BY

AGENT

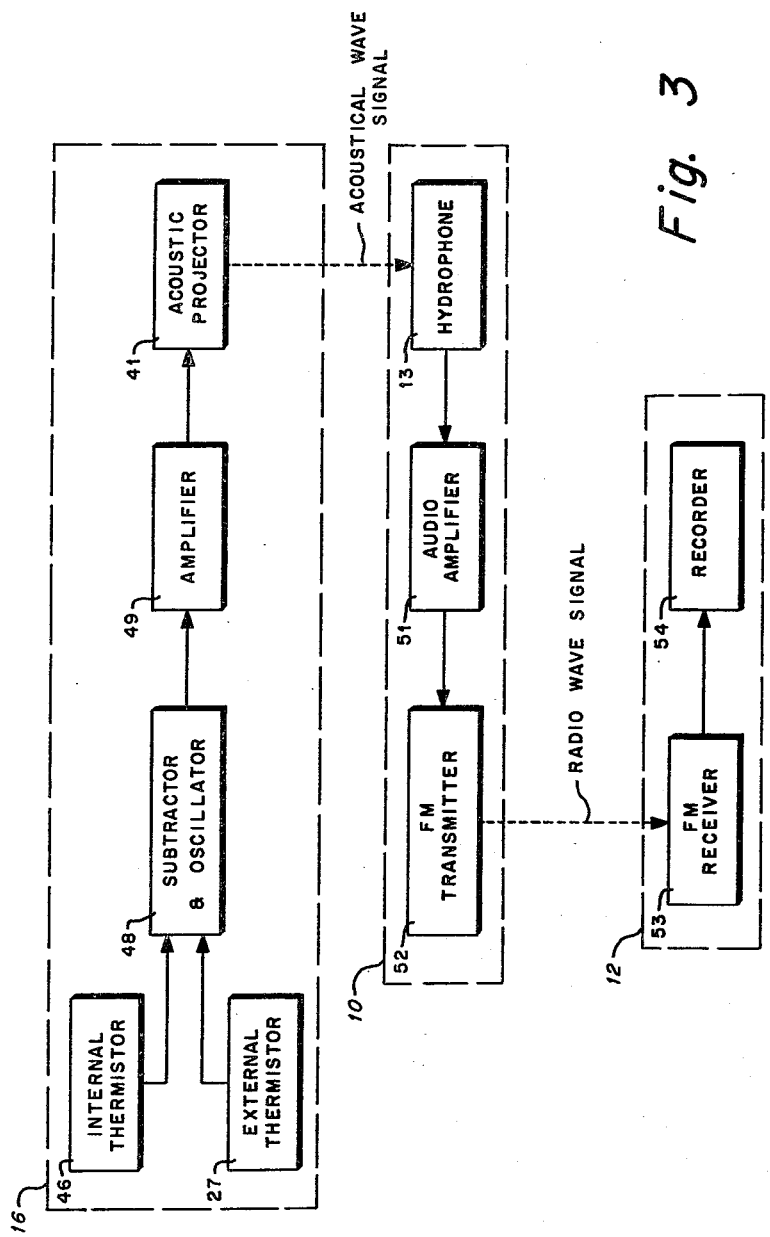

United States Patent Office 3,098,993
Patented July 23, 1963

3,098,993
SONOBUOY-BATHYTHERMOGRAPH SYSTEM
Jesse J. Coop, Willow Grove, Pa., assignor to the United States of America, as represented by the Secretary of the Navy
Filed Dec. 21, 1959, Ser. No. 861,149
7 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus and methods for determining the vertical temperature gradient in a large body of water such as a sea and more particularly to apparatus and methods for determining the vertical temperature gradient in a sea from an aircraft and utilizing sonobuoys of the type in current use.

The development of airborne sonar systems which employ sonobuoys in anti-submarine warfare has as one of its objectives to enable an aircraft flying at high speeds to quickly survey vast areas of the sea below for underwater craft. In sonar systems, generally, information on sound refraction is of importance in determining direction, particularly in a vertical plane where the velocity gradient is usually most prominent. Variations in the velocity of propagation of sound in the sea are also of vital interest to the interpretation of measurements of distance from a sound source, such as an echo-ranging signal.

The velocity of propagation and refraction of sound through the sea water are both functions of the temperature, depth and salinity of the sea water. Except in the vicinity of river mouths where fresh and salt waters appear, variations in salinity are generally of no consequence. However, the condition of temperature is known to vary sufficiently with depth as to remain an important consideration. The temperature variation significantly effects the velocity and refraction of sound. In this connection, a more extensive discussion of the cause and effect of sound propagation and sound refraction is found in "Fundamentals of Sonar" by J. Warren Horton; U.S. Navy Underwater Sound Laboratory; Vol. 1, September 20, 1954.

It is understood in the art that sea water gradient conditions may be determined by an instrument known as a bathythermograph, which among other things is capable of measuring water temperature and pressure. The instrument is lowered to predetermined depths from a surface vessel by a cable. In airborne sonar systems employing sonobuoys a separate expendable buoy containing a bathythermograph and radio transmitter is dropped into the sea from an aircraft. The buoy then releases and lowers the bathythermograph by a cable. The bathythermograph transmits temperature and pressure information through the cable to the buoy which in turn relays it to a receiver-recorder in the aircraft. Whether the bathythermograph is lowered from a surface vessel or an air-dropped buoy, the cable mechanism for lowering the bathythermograph is complicated and expensive with respect to money, aircraft weight and space.

It is an object of the present invention to provide novel apparatus, dispensable from an aircraft flying at high speeds, for obtaining temperature versus depth information of the sea and transmitting this information to a receiver-recorder in the aircraft.

It is another object of the invention to provide a unique method for obtaining temperature versus depth information of the sea by using sonobuoys of the type in current use.

Still another object of the invention is to provide an improved method of obtaining the vertical temperature distribution of a large body of water such as a sea or an ocean using a sonobuoy-bathythermograph system dispensible from an aircraft and a receiver recorder system in the aircraft.

A further object of the invention is the provision of a novel bathythermograph device dispensable from an aircraft which acoustically transmits temperature versus depth information to a sonobuoy of the type in current use.

Still another object of the invention is to provide an improved cableless bathythermograph device dispensable from the air and which descends in the water at a substantially constant rate.

A still further object of the invention is to provide novel apparatus dispensable from an aircraft flying at high speeds for obtaining temperature difference versus depth information of the sea on a receiver-recorder in the aircraft.

Figure 2:
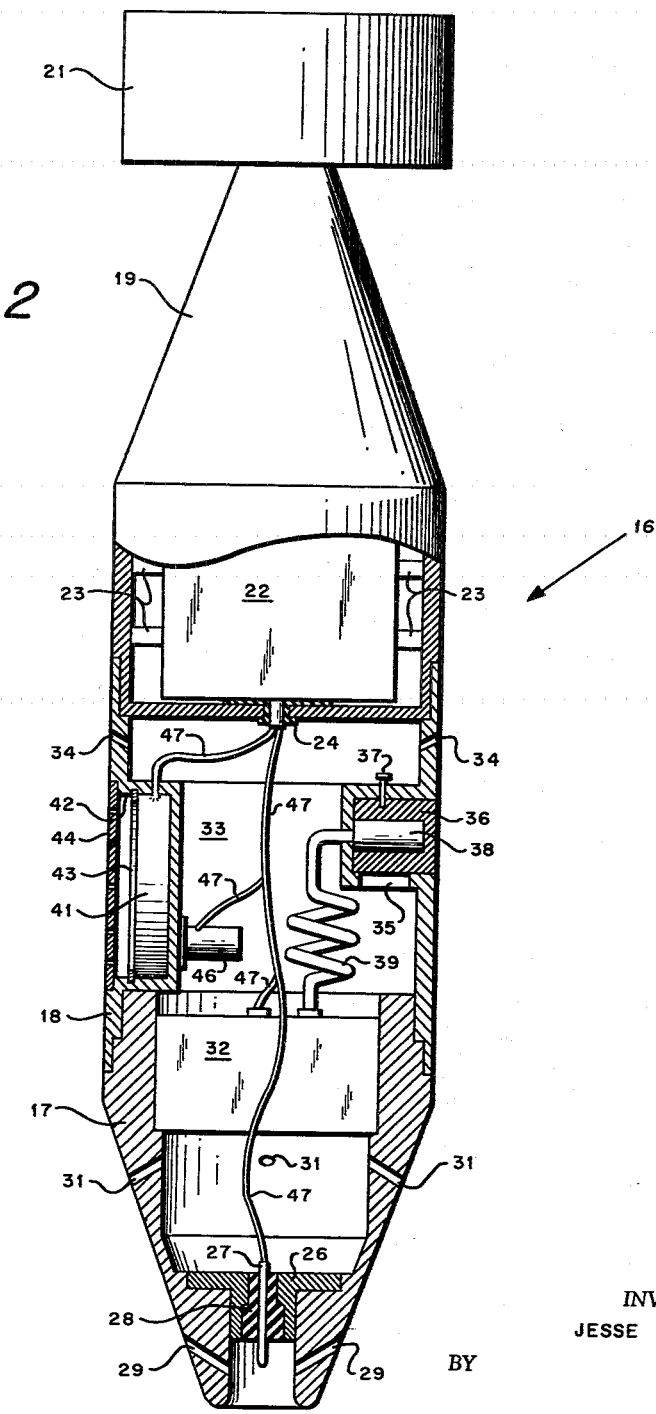

These and other objects and many of the attendant advantages of the present invention will be readily appreciated as the same become better understood by reference to the following detailed description when considered in connection with the accompanying drawings wherein:

FIG. 1 diagrammatically illustrates an elevational view of a bathythermograph descending in the sea;

FIG. 2 is a detailed partially cross-sectional view of the bathythermograph illustrated diagrammatically in FIG. 1; and FIG. 3 is a block diagram of the principal components for producing temperature versus depth measurements on a remotely located recorder.

Referring to the drawings, wherein like reference characters designate like or corresponding parts through the several views, there is shown in FIG. 1 a sonobuoy 10 freely floating in the sea or ocean and of the type currently used in detecting underwater sound sources or echoes. The sonobuoy 10 comprises a float 11 containing a radio transmitter and antenna for sending signals to an aircraft 12. The signals are received from an omnidirectional electroacoustical transducer 13, hereafter referred to as a hydrophone, suspended from float 11 by a cable 14. The hydrophone 13 is omnidirectional and is preferably a single-point-type pressure transducer which is equally responsive to sound waves of a given intensity propagated from any direction.

A bathythermograph generally indicated by numeral 16 is operationally depicted descending in the sea near the sonobuoy 10 and acoustically telemetering a temperature measurement to the hydrophone 13. The bathythermograph 16 is of a ballistic configuration so that it can be dropped into the sea from the aircraft 12 while flying at a high speed. As illustrated, the bathythermograph 16 was dispensed from the aircraft 12 at point A and followed a path A—B—C—D as the aircraft proceeded along its course to point E.

A preferred embodiment of the bathythermograph 16 is shown in detail in FIG. 2. The bathythermograph 16 comprises three main sections: a nose cone section 17, a middle section 18, and a tail cone section 19. The tail cone section 19 includes a stabilizer shroud 21 and further constitutes a sealed container for electrical gear 22 held by structural members 23. A grommet 24 provides a water-tight seal whereby electrical wires enter the tail cone section 19.

The nose cone section 17 is shown as having an insert 26 in which an external thermistor 27 is retained in potting 28. Holes 29 prevent entrapment and stagnation of water around the external thermistor 27 as the bathythermograph 16 descends in the sea. Sea water entering inlets 31 provide an electrolyte for a sea water activated battery 32 thus forming a direct current electrical power supply.

The middle section 18, which is secured between the tail and nose cone sections, forms with the nose cone section 17 a water cavity 33 having air vents 34. A flooding intake 35 is shown blocked by a plug 36 held in place by a shear pin 37. A squib 38 within the plug 36 is connected to the battery 32 by a timing fuse 39. When the water cavity 33 is completely flooded, the bathythermograph 16 will descend in the water at a sufficiently predictable speed so that depth information need not be measured and transmitted. In practice the rate of descent is substantially constant. Integrally disposed in the midsection 18 is an acoustical projector 41 which may be a barium titanate-type transducer, and is secured in a projector well 42 by a retaining ring 43. The projector 41 converts an audio frequency electrical signal to a mechanical oscillation which propagates a sound wave into the surrounding fluid. A perforated cover plate 44 forms a continuous cylindrical surface at the middle section 18 and provides a contiguous relation between the surrounding sea water and the projector 41 for negligible attenuation of sound waves propagated by the projector 41. An internal thermistor 46 responds to the temperature of the water in the cavity 33.

Electrical connections from the electrical gear 22 and the thermistors 27 and 46, and the projector 41 are illustrated by cables 47.

Alternatively, a dry cell or mercury cell battery and mechanical timer started on impact are contemplated for the sea water activated battery and timer fuse.

FIG. 3 illustrates in a block diagram the manner in which a temperature difference versus depth measurement is produced on a recorder at a remote location. Bathythermograph 16, sonobuoy 10 and aircraft 12 are depicted as rectangles in order to show the major electrical components contained therein. In bathythermograph 16, a temperature difference produces a net change in resistance of thermistors 27 and 46 and appears on the output of a subtractor and oscillator 48 as a modulated frequency. The output signal of the oscillator 48 is amplified by amplifier 49 for driving the acoustic projector 41.

The underwater acoustical wave produced by the projector 41 is detected and electrically reproduced by the hydrophone 13 and appears as a frequency modulated radio signal by means of an audio amplifier 51 and a frequency-modulated transmitter 52.

The radio signal, received in the aircraft 12 by a frequency modulated receiver 53, emerges as a direct current voltage for driving a recording pen along one of the two coordinates of a conventional recorder 54. The other of the two coordinates is a function of time as determined by a rated constant speed motor driving the chart. Due to the nearly constant rate of descent of the bathythermograph 16, the recorder pen will substantially describe a rectilinear plot of temperature difference versus depth.

It is also contemplated that the internal thermistor 46 may be omitted whereby the plot will represent temperature variation from a fixed datum of the external thermistor 27 instead of from the surface water temperature.

The operation of the sonobuoy-bathythermograph system will now be summarized. Under unknown oceanographic conditions, it is desired to determine temperature versus depth distribution in order that the velocity of sound and probable disposition of sound rays can be predicted for subsequent use of sonar in search of submarines. In FIG. 1, the aircraft 12 while flying over the sea area to be searched dispenses the bathythermograph 16 at point A. It is intended that the sonobuoy 10 also be dropped from the aircraft 12 at the same time as the bathythermograph 16. While the sonobuoy 10 alights on the surface of the water and is activated in preparation to receive acoustical data, the bathythermograph 16 enters the water. Upon impact with the water, the bathythermograph 16 will submerge at high speed to a depth of about 10 to 30 feet, illustrated as point B. Notwithstanding the entry of water through inlets 31 (FIG. 2), the bathythermograph 16 remains buoyant and returns to the surface. The water entering inlets 31 activates battery 32 and after a time delay imposed by the fuse 39, which is sufficient to allow the bathythermograph 16 to reach the surface at point C, the explosive squib 38 is fired to open flooding intake 35. Thus, sudden and complete filling of the cavity 33 occurs and the bathythermograph 16 descends along the path C—D to the sea or ocean floor.

In a preferred embodiment of the invention the recorder chart is in operation during the time of the final descent of the bathythermograph 16, and the start of the descent is marked on the chart by a second pen responsive to the sharp acoustic pulse produced by the exploding squib 38. The small time interval between the explosion and actual descent and the time required for the bathythermograph 16 to reach a substantially constant sinking speed can be experimentally determined and a correction can be applied to the time or depth coordinate of the chart.

An alternative means of producing a starting mark on the chart consists of actuating the bathythermograph electrical gear 22 simultaneously with the energization of the squib firing circuit by means of parallel contacts. Such an arrangement causes the temperature recording pen to move from its zero or rest position to the indicated temperature position at the start of flooding.

Since flooding of the bathythermograph 16 occurs at the surface of the water, shown as point C in FIG. 1, the internal thermistor 46 will substantially indicate the temperature of the water at the surface. As the bathythermograph 16 sinks, there is negligible transfer of water between cavity 33 and the surrounding water, hence the resistance of the internal thermistor 46 remains constant during the descent. The external thermistor 27, however, is exposed to the surrounding water whose temperature varies with depth. The thermistors are connected in the subtractor and oscillator 48 so that the difference in the constant surface water temperature at internal thermistor 46 and the varying surrounding water temperature at external thermistor 27 is transformed into an acoustical wave and is relayed, in the manner described, by the sonobuoy 10 to the aircraft 12, now at point E. The receiver-recorder plots the temperature difference against time which is a function of the depth.

It should be understood that the foregoing disclosure relates only to preferred embodiments of the invention and that numerous modifications and variations may be made therein without departing from the spirit and scope of the invention as set forth in the appended claims.

What is claimed is:

1. Apparatus for determining the vertical temperature distribution of a large body of water of the character described comprising, in combination: first means dispensable from above the surface of the water including a bathythermograph having means for continuously measuring the temperature difference between the water at the surface and the water along the path of descent, and means for generating and propagating in the water discrete acoustical wave signals at an audio frequency representative of the water temperature difference; and further including a sonobuoy having means for receiving said signals, and means for generating and transmitting radio wave signals above the surface of the water at a radio frequency representative of said acoustical wave signals, and second means disposed above the surface of the water for receiving and recording said radio signals.

2. Apparatus for determining the vertical temperature distribution of a large body of water of the character described comprising, in combination: a bathythermograph dispensable from an aircraft into the water and having means for continuously measuring the temperature difference getween the water at the surface and the water along the path of descent, and means for generating and propagating discrete audio signals in the water indicative of the water temperature difference detected; a sonobuoy for receiving said signals and relaying said signals to the aircraft; and a recorder and receiver in the aircraft for producing a visual indication of the signal.

3. Apparatus as claimed in claim 2 wherein said bathythermograph is further defined as having walls forming a cavity such that the average density of said bathythermograph is less than the density of the water, means for flooding the cavity with the water to increase the average density of said bathythermograph to an amount greater than the density of the water, a timing means for delaying actuation of said flooding means after immersion in the water, a means responsive to the temperature of the water in the cavity when flooded, a means responsive to the temperature of the water surrounding the bathythermograph, a subtractor and oscillator means having two inputs respectively connected to said temperature responsive means and producing an output signal proportional to the temperature difference sensed by each of said temperature responsive means, and sound projector means connected to receive the output signal of said subtractor and oscillator.

4. In a bathythermograph for obtaining the vertical temperature distribution of a large body of water of the character described, means dispensable from an aircraft into the water, comprising: a ballistic-shaped casing including a stabilizer mounted thereon, a cavity formed by the walls of said casing, passage means formed by the wall of said casing for communicating said cavity with the outside of said casing, flooding means sealingly inserted in said passage means, actuator means operatively responsive to water immersion when said bathythermograph is immersed for ejecting said flooding means from said passage means after a predetermined time interval, transducer means for producing signals in accordance with the temperature of the water, and projector means for propagating an acoustical wave signal as a function of the signals.

5. In a bathythermograph for obtaining the vertical temperature distribution of a large body of water of the character described, means dispensable from above the surface of the water into the water, comprising: a ballistic-shaped casing with a stabilizer mounted thereon and including a coaxially connected nose cone, middle and tail cone sections, said tail cone section forming a sealed compartment therein, electrical gear mounted in said compartment, said middle and nose cone sections forming a single cavity in front of said tail cone section, inlet means in said nose cone section for conducting a limited quantity of the water surrounding said casing into the cavity, a sea activated battery secured in the cavity and forming a power supply when immersed in the water, a sound projector recessed in said middle section wall for propagating sounds into the surrounding water, a squib-fired plug means in said middle section wall for quickly flooding said cavity, timer means for delaying squib firing for a predetermined time after immersion of the battery in the water, vent means in said middle section wall, first temperature responsive means mounted in the cavity for measuring the temperature of the fluid contained therein, and second temperature responsive means mounted on said nose cone wall for measuring the temperature of the outside water, said electrical gear being connected to said first and second temperature responsive means for generating an electrical signal proportional to the temperature difference between said first and second temperature responsive means.

6. In a bathythermograph as claimed in claim 5, means for securing said second temperature responsive means in a potted mount in a well in the forward part of the nose cone section, and bleed holes around the well for circulating the surrounding water as the bathythermograph descends in the water.

7. In a bathythermograph as claimed in claim 5, a perforated plate in said middle section wall to form a continuous cylindrical outer surface over said projector.

References Cited in the file of this patent

UNITED STATES PATENTS

| | | |
|---|---|---|
| 2,361,177 | Chilowsky | Oct. 24, 1944 |
| 2,629,083 | Mason et al. | Feb. 17, 1953 |
| 2,699,675 | Buck et al. | Jan. 18, 1955 |
| 2,750,794 | Downs | June 19, 1956 |
| 2,978,668 | Kurie et al. | Apr. 4, 1961 |
| 3,022,462 | Keiper | Feb. 20, 1962 |